United States Patent
Chiang et al.

(10) Patent No.: US 8,913,895 B1
(45) Date of Patent: Dec. 16, 2014

(54) METHOD AND APPARATUS FOR CONTROLLING TIMING OF A TRANSMISSION SIGNAL FROM A NETWORK TERMINATION DEVICE

(75) Inventors: John M. Chiang, San Jose, CA (US); Cesar A. Johnston, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 4 days.

(21) Appl. No.: 13/523,610

(22) Filed: Jun. 14, 2012

Related U.S. Application Data

(62) Division of application No. 11/948,575, filed on Nov. 30, 2007, now Pat. No. 8,208,815.

(60) Provisional application No. 60/867,950, filed on Nov. 30, 2006.

(51) Int. Cl.
*H04B 10/40* (2013.01)

(52) U.S. Cl.
USPC .......................................................... 398/155

(58) Field of Classification Search
USPC ................................................ 398/154–155
See application file for complete search history.

(56) References Cited

U.S. PATENT DOCUMENTS

| | | | |
|---|---|---|---|
| 6,243,369 B1 | 6/2001 | Grimwood et al. | |
| 7,545,899 B2 | 6/2009 | Amirichimeh et al. | |
| 7,558,357 B1 * | 7/2009 | Greshishchev et al. | 375/371 |
| 2002/0136232 A1 * | 9/2002 | Dudziak et al. | 370/445 |
| 2004/0071251 A1 * | 4/2004 | Sutioso et al. | 375/373 |
| 2005/0041727 A1 | 2/2005 | Agazi | |
| 2006/0104637 A1 | 5/2006 | Huffman et al. | |
| 2007/0154215 A1 * | 7/2007 | Zuhdi | 398/67 |
| 2007/0264026 A1 * | 11/2007 | Miguel | 398/155 |
| 2008/0019706 A1 * | 1/2008 | Levinson et al. | 398/202 |

OTHER PUBLICATIONS

ITU-T G.984.3, "Gigabit-capable Passive Optical Networks (G-PON): Transmission convergence layer specification", Feb. 2004.*

ITU-T Telecommunication Standardization Sector of ITU—G.984.4—Series G: Transmission Systems and Media, Digital Systems and Networks, Digital sections and digital line system—Optical line systems for local and access networks—Gigabit-capable Passive Optical Networks (G-PON): ONT management and control interface specification (2004).

(Continued)

*Primary Examiner* — Shi K Li

(57) ABSTRACT

In a method for controlling timing of a transmission signal from a network termination device having a receiver and a transmitter, a signal is received at the receiver of the network termination device, the signal having been transmitted in accordance with a predetermined bit rate. A core clock signal for the receiver is determined based on the predetermined bit rate at which the signal was transmitted, and the core clock signal is communicated to the transmitter of the network termination device. At the transmitter of the network termination device, a phase adjusted clock signal is generated, and the phase adjusted clock signal is set as the transmitter clock signal. The transmitter clock signal is offset from the core clock signal, and the transmission signal is transmitted from the transmitter of the network termination device based on the transmitter clock signal.

16 Claims, 11 Drawing Sheets

(56) References Cited

OTHER PUBLICATIONS

ITU-T Telecommunication Standardization Sector of ITU—G.984.4 Amendment 1, Series G: Transmission Systems and Media, Digital Systems and Networks, Digital sections and digital line system—Optical line systems for local and access networks—Gigabit-capable Passive Optical Networks (G-PON): ONT management and control interface specification (2005).

ITU-T Telecommunication Standardization Sector of ITU—G.984.4 Amendment 2—Series G: Transmission Systems and Media, Digital Systems and Networks, Digital sections and digital line system—Optical line systems for local and access networks—Gigabit-capable Passive Optical Networks (G-PON): ONT management and control interface specification (2006).

ITU-T Telecommunication Standardization Sector of ITU G.984.4, Series G: Transmission Systems and Media, Digital Systems and Networks, Digital sections and digital line system—Optical line systems for local and access networks, Gigabit-capable Passive Optical Networks (G-PON): ONT management and control interface specification (2004).

ITU-T Telecommunication Standardization Sector of ITU G.984.4 Amendment 1, Series G: Transmission Systems and Media, Digital Systems and Networks—Digital sections and digital line system—Optical line systems for local and access networks, Gigabit-capable Passive Optical Networks (G-PON): ONT management and control interface specification (2005).

ITU-T Telecommunication Standardization Sector of ITU G.984.4 Amendment 2, Series G: Transmission Systems and Media, Digital Systems and Networks—Digital sections and digital line system—Optical line systems for local and access networks, Gigabit-capable Passive Optical Networks (G-PON): ONT management and control interface specification (2006).

AMCC, "High Definition Serial Digital Interface (HD-SDI) Chipset", Dec. 10, 1999.

* cited by examiner

METHOD AND APPARATUS FOR CONTROLLING TIMING OF A TRANSMISSION SIGNAL FROM A NETWORK TERMINATION DEVICE

CROSS-REFERENCE TO RELATED APPLICATION

The present application is a divisional of U.S. application Ser. No. 11/948,575, entitled "A bit accurate upstream burst transmission phase method for reducing burst data arrival variation," filed on Nov. 30, 2007, now U.S. Pat. No. 8,208,815, which claims the benefit of U.S. Provisional Application No. 60/867,950, entitled "A bit accurate upstream burst transmission phase method for reducing burst data arrival variation," filed on Nov. 30, 2006. Both of the above-referenced applications are hereby incorporated by reference herein in their entireties.

FIELD OF TECHNOLOGY

The present disclosure relates generally to point-to-multipoint networks, and more particularly, to techniques for transmitting signals in a passive optical network.

BACKGROUND

Point-to-multipoint networks such as passive optical networks (PONs) can provide efficient communications from a central location to a plurality of users without exorbitant power demands. A typical PON includes an optical line termination (OLT) acting as a single point on the network side and a plurality of optical network units (ONUs) and/or optical network terminations (ONTs) acting as user terminations on the customer side. Connection between the OLT and the ONTs/ONUs can be achieved via a single or multiple optical fibers that use passive (e.g., non-electrically powered) optical components to affect transmission and reception.

To allow multiple ONTs and ONUs to use a single transmission path to the OLT, the OLT assigns and communicates a downstream signal providing an allocation period to each ONU and ONT instructing each when it may transmit and the various overhead and/or user data rates that it may employ for such transmission. The physical distance from the OLT to the ONUs and ONTs may vary considerably in a PON. Therefore, a PON will perform a ranging procedure, such as a full digital in-band based activation, to measure the distance of each end user location. The ranging procedure determines the different timing delays for each of the ONUs and ONTs, such that these timing delays may be used by the ONUs and ONTs to ensure that their upstream burst transmissions are received at the OLT in a synchronized manner and at the time corresponding to the time allocation originally provided by the OLT.

For Gigabit PON (GPON) networks, in particular, there are three basic requirements for ranging as outlined in the ITU-T recommendations: (1) that the maximum range of the GPON be at least 20 km (this is the maximum differential between the farthest and the nearest ONU/ONT measured from the OLT); (2) no disruption of service to any ONU/ONT other than the one performing transmission delay measurement; (3) when ranging a new ONU/ONT, the other working ONUs/ONTs must temporarily stop transmission. Assuming these conditions are met, the GPON network may be properly ranged.

Careful determination of the ONU/ONT timing delay is key to proper ranging and proper network operation. The length of each upstream frame (from ONU/ONT to OLT) may be the same as the length for a downstream frame (from the OLT to ONUs/ONTs) for all communication rates. Thus, each upstream frame may contain transmissions bursts from each of the ONUs and ONTs, where an upstream bandwidth (BW) allocation map will indicate to the OLT the arrangement of these transmissions and where these bursts are combined using a multiple access protocol, such as time division multiple access (TDMA). If the ranging procedure is not performed properly, and if the ONU/ONT does not itself time its upstream bursts in a manner commensurate with the corresponding timing delay and assigned bandwidth window, then the OLT may fail to properly recover the upstream burst. This failure of course would affect the upstream burst from the incorrectly timed ONU or ONT, but it could also affect the OLT's ability to properly resolve the upstream bursts from other ONUs/ONTs.

SUMMARY OF THE DISCLOSURE

In one embodiment, a method for controlling timing of a transmission signal from a network termination device having a receiver and a transmitter includes receiving a signal at the receiver of the network termination device, the signal having been transmitted in accordance with a predetermined bit rate. The method also includes determining a core clock signal for the receiver based on the predetermined bit rate at which the signal was transmitted, and communicating the core clock signal to the transmitter of the network termination device. Additionally, the method includes, at the transmitter of the network termination device, generating a phase adjusted clock signal, and setting the phase adjusted clock signal as the transmitter clock signal. The transmitter clock signal is offset from the core clock signal, and the transmission signal is transmitted from the transmitter of the network termination device based on the transmitter clock signal.

In another embodiment, an apparatus for controlling timing of an upstream transmission from an optical network termination device to an optical line termination device in a passive optical network comprises a receiver to receive a downstream transmission from the optical line termination device, and analyze the downstream transmission to determine a core clock signal for the receiver. Additionally, the apparatus comprises a transmitter to (i) form the upstream transmission based on processing of the downstream transmission, and (ii) produce a phase offset signal to control conversion of the core clock signal to a transmitter clock signal offset. The transmitter includes a phase adjusted clock signal generator to receive the core clock signal from the receiver and generate a transmitter clock signal, and an upstream framing controller coupled to the phase adjusted clock signal generator to control phase of the transmitter clock signal. The transmitter clock signal offset is used in timing the transmission of the upstream transmission.

DETAILED DESCRIPTION

Figure 1:
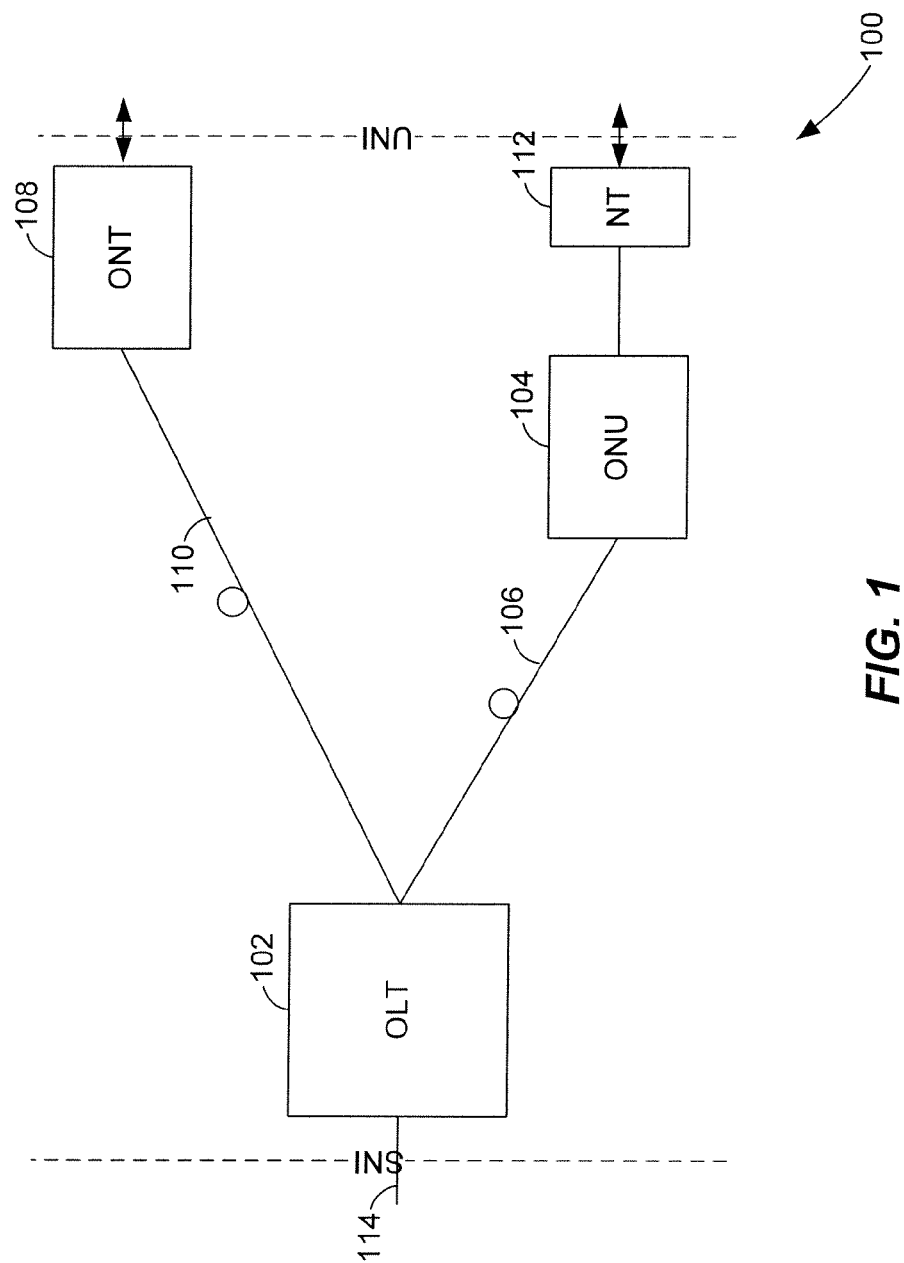
FIG. 1 is a block diagram of a passive optical network.

FIG. 1 shows an example GPON configuration 100 with an OLT 102 communicatively coupled to a backbone network as a service node interface (SNI), 114, such as at a provider of internet services, television services, telephony services, video/audio broadcast services, or other network services provider. Typical backbone interfaces include time division multiplexed (TDM) interfaces, such as SONET/SDH or PDH, and Gigabit and 100 Mbits/s Ethernets. The OLT 102 is communicatively coupled to an ONU 104 through optical fiber 106 and to an ONT 108 through another optical fiber 110, with both the ONT 108 and the ONU 104 being at a user network interface end of the configuration 100. The ONU 104 and the ONT 108 may operate under an asynchronous transfer mode (ATM), a GPON encapsulation method (GEM) mode, or a dual mode, in typical examples. While this disclosure refers to both ONUs (e.g., 104) and ONTs (e.g., 108), it should be understood that in the context of this disclosure, ONTs and ONUs may be treated similarly and these terms may be considered interchangeable.

As would be understood by persons of ordinary skill in the art, typically, the GPON system 100 would operate at rates of 1.244 and 2.488 Gbits/s downstream and 155 Mbits/s, 622 Mbits/s, 1.244 Gbits/s, and 2.488 Gbits/s upstream. Although, the system 100 is not limited to any particular operating rates.

Although only a single ONU 104 and a single ONT 108 are shown, it should be understood that in a point-to-multipoint optical network, the optical fibers 106 and 110 may each run, one-to-one from the OLT 102 to the ONU 104 and the ONT 108 where there may be multiple ONUs and ONTs in a passive optical network, each of which may in turn service end users. Additionally, while single fibers 106 and 110 are shown, it will be understood that passive optical components, such as optical splitters, may be used to branch fibers for connecting to multiple ONUs/ONTs. In the illustrated example, the ONT 108 may refer to an integrated unit for an end user that presents services of the service provider to the end user (e.g., video, data, telephony, etc.), while the ONU 104 may be an optoelectronic interface to network termination (NT) 112, where the ONU 104 terminates the passive optical network and the NT 112 provides the services to the end user. The ONU 104, for example, may handle data packet conversion between the passive optical network and the NT 112.

Generally, the OLT 102 provides downstream broadcasts to each of the ONTs 108 and each of the ONUs 104 on different dedicated one-to-one fibers, where each ONT 108 and/or ONU 104 individually reads only the content of the transmissions intended for the particular ONT 108 and/or ONU 104. The ONTs 108 and the ONUs 104 provide upstream transmissions to the OLT 102 via their individual fibers. Communications between the OLT 102 and the ONT 108 or ONU 104 generally utilize wavelength division multiplexing with the downstream broadcasts utilizing one wavelength and upstream transmissions utilizing another wavelength. In some examples, the optical fibers 106 and 110 may be compliant with the ITU G.652 standard and support downstream wavelengths between 1480-1500 nm and upstream wavelengths between 1260-1360 nm. For two-fiber downstream systems, the downstream wavelengths may be 1260-1360 nm. Of course, the passive optical networks herein are not limited to a particular wavelength range on downstream or upstream communication. Furthermore, although the passive optical network configuration 100 is described as having one-to-one fibers between the OLT 102 and the ONTs/ONUs 108, 104, it should be understood that multiple fibers may be utilized in the one-to-one correspondence between the OLT 102 and each corresponding ONT/ONU 108, 104. In one example, each connection between the OLT 102 and the ONTs/ONUs 108, 104 may utilize two fibers, with one for upstream transmissions and one for downstream transmission, rather than wavelength division multiplexing signals that share the same fiber.

The OLT 102 provides a variety of functions within the passive optical network 100. At one level, the OLT 102 provides an interface 114 between the passive optical network 100 and a backbone network of the service provider network, which may include supporting time division multiplexed (TDM) protocols at different rates of speed, internet protocol (IP) traffic, ATM protocols, etc. The OLT 102 further facilitates both upstream and downstream communication between the service provider and the ONTs 108 and ONUs 104. For example, the OLT 102 allocates upstream bandwidth to the ONTs 108 and ONUs 104 by granting intervals of time (e.g., time slot assignments) to each of the ONTs 108 and ONUs 104 to transmit upstream communications without collisions on the fiber. Upstream bandwidth allocation may be fixed for ONTs 108 or ONUs 104 requiring continuous (e.g., guaranteed) bandwidth availability. For ONTs 108 or ONUs 104 that do not require continuous bandwidth availability (e.g., burst transmissions), the OLT 102 may utilize dynamic bandwidth allocation (DBA) based on either polling bandwidth information from the ONTs 108 and ONUs 104 or based on the occurrence of idle gigabit passive optical network (GPON) encapsulation method (GEM) frames from the ONTs 108 or ONUs 104. In addition, the ONTs 108 and ONUs 104 are typically provided at different distances from the OLT 102, and the OLT 102, as discussed below, utilizes a ranging protocol to equalize the optical path length and equalize the transmission delay between the OLT 102 and the various ONTs 108 and ONUs 104. For example, the OLT 102 may measure the transmission delay for each ONT 108 and ONU 104, and transmit a physical layer operations and maintenance (PLOAM) message to set an equalizing delay in the ONT 108 or ONU 104. The OLT 102 further provides centralized media access control (MAC) for the passive optical network 100 for purposes of upstream bandwidth allocation.

Upstream and downstream transmissions between the OLT 102 and the ONTs 108 or ONUs 104 may be performed in a transmission convergence frame format, whereby the transmission data, regardless of the services being provided, is encapsulated in the same type of data packet for transmission over the passive optical network 100. In particular, the transmissions between the OLT 102 and the ONTs 108 or ONUs 104 may take advantage of the gigabit passive optical network (GPON) standard developed by the International Telecommunications Union (ITU), e.g., the standard is also known as ITU-T G.984. As is known, the GPON standard generally provides greater security as compared to previous standards, greater bandwidth, larger variable-width data packets, higher data rates and supports various Layer 2 protocols including ATM, Ethernet and GEM.

Although the present disclosure generally refers to a GPON, it should be understood that all or part of this disclosure may be equally applicable to, or supportive of, previous-generation passive optical network standards, such as an asynchronous transfer mode (ATM) passive optical network (APON) and broadband passive optical network (BPON), current passive optical network standards, such as Ethernet passive optical network (EPON), and future passive optical network standards, such as wavelength division multiplex passive optical network (WDM-PON). The disclosure may also be equally applicable to variations on the GPON standard.

In operation, the OLT 102 executes an activation protocol to add network devices, i.e., ONUs, ONTs, and end user devices. This protocol is important for ranging each of the ONUs/ONTs 104, 108, of which there may be hundreds for a given OLT 102, to determine how far each is physically spaced from the OLT/office 102. The activation protocol may ensure that every single ONU/ONT 104, 108 is treated, temporally speaking, as having the same distance from the OLT 102 for synchronous communication at the OLT 102.

As part of the activation protocol, GPON system 100 may use a full digital in-band based activation method to measure the logical distances between the ONU 104 and ONT 108 and the OLT 102. Once the ONU 104 and ONT 108 are ranged, they become operational on the GPON system 100. As noted above, the maximum range of the GPON 100 is at least 20 km. Furthermore, the transmission delays measurement for each ONU 104/ONT 108 may be performed while the GPON 100 is in-service and without disrupting service to other ONUs/ONTs (not shown). Further, when ranging the ONU 104/ONT 108, any working ONUs/ONTs must temporarily stop transmission, thereby opening a ranging window. Information about the position of the ONU 104/ONT 108 can minimize this ranging window, but for ONUs/ONTs 104, 108 that have not been previously ranged, the duration is determined according to the maximum differential range of the GPON system 100. For example, the network operator may provide the GPON system 100 with a prior minimum and maximum OLT_ONU (or OLT_ONT) distance as information regarding likely or actual unit position. In other examples, a default distance range is set from 0 km minimum to 20 Km maximum. For ONUs/ONTs 104, 108 that have not been previously ranged, the start and end of the ranging window may be determined from these provisioned minimum and maximum distances.

Generally speaking, the GPON system 100 uses two methods for installing the ONU/ONT 104, 108. First, the serial number of the ONU/ONT 104, 108 is registered at the OLT in advance by the OpS system. Second, when the serial number of the ONU/ONT 104, 108 is not registered at the OLT 102, an automatic detection mechanism is performed to determine the serial number of the ONU/ONT. When a new ONU/ONT is detected without a serial number, an ONU-ID (or ONT-ID) is assigned by the OLT and the unit is activated.

There are three triggers for initiating the activation of an ONU/ONT 104, 108. First, the network operator enables the activation process to start when it is known that the new ONU/ONT 104, 108 has been connected. This requires a function call through an API and then the embedded software driver starts a process shown in FIG. 2, and discussed below. Second, the OLT 102 may automatically initiate the activation process when one or more of the previously working ONUs/ONTs 104, 108 are identified at the OLT 102 as "missing." In this example, the OLT 102 seeks to return to service the potentially problematic ONU or ONT. The frequency of polling used to identify such ONUs/ONTs 104, 108 may be adjusted through programming of the OpS system. Third, the OLT 102 periodically initiates the activation process, testing to see if any new ONUs/ONTs 104, 108 have been connected to the GPON system 100, where the frequency of such polling is also programmable under instruction of the OpS system.

As outlined in the specification for a GPON network, there are a number of different situations from which a GPON system may determine that a ranging protocol is required. First, for a cold passive optical network (GPON) and cold ONU(ONT), there will be no upstream traffic running and the ONU will not yet have received an ONU(ONT)_ID from the OLT. Second, a warm GPON and cold ONU(ONT) may indicate that the network may have a new ONU(ONT) previously un-ranged or previously-active and not "missing." Third, for a warm GPON and warm ONU(ONT), a previously active ONU(ONT) that remains powered-on and connected to an active GPON, but due to long alarm status, the connected ONU(ONT) is set to an initial_state (O1). Fourth, if there is a switch over from one network protocol like GEM to another like ATM there can be several types of possible duplex and/or partially duplexed ATM-PON configurations that must be ranged after the switchover.

Figure 2:
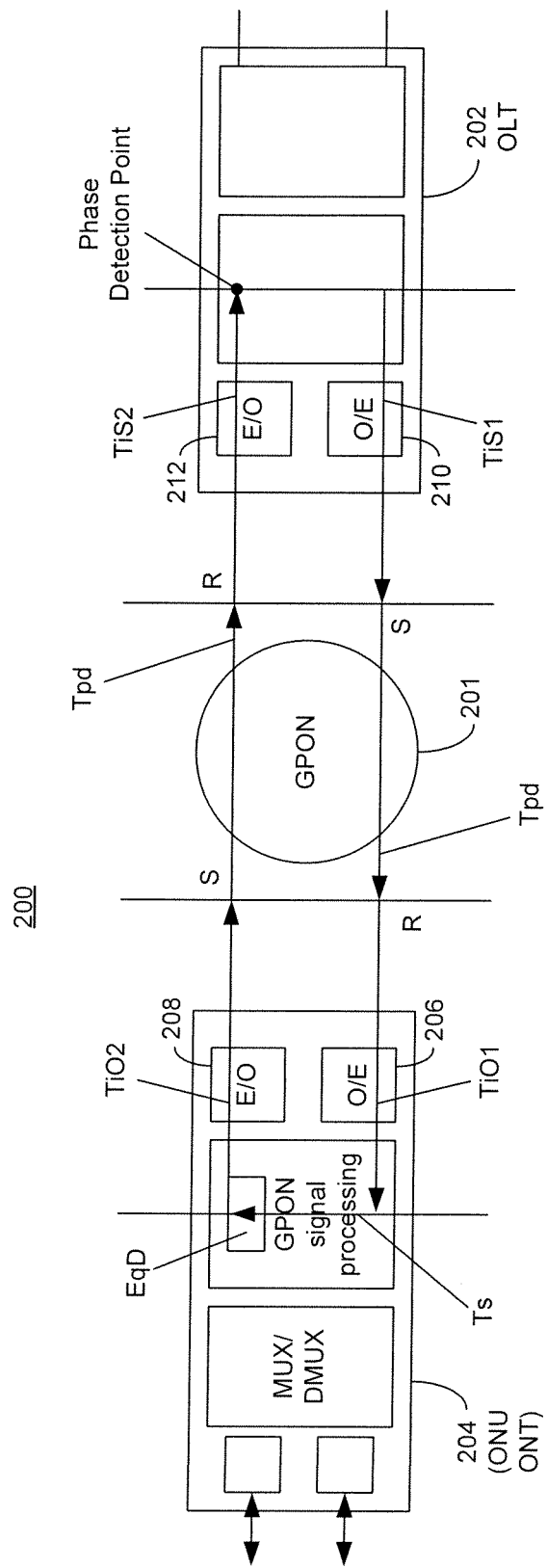
FIG. 2 is another block diagram of a passive optical network during a ranging procedure.

In any event, as part of deriving the ranging time duration for each ONU 104/ONT 108 of the GPON system 100, the GPON system 100 determines an equalization-delay for the round trip time between the OLT 102 and the respective ONU 104/ONT 108. FIG. 2 illustrates a GPON configuration 200 showing the various phase delay points from which the measured round trip delay (RTD) is calculated as follows:

$$RTD=2*Tpd+TiO1+Ts+TiO2+TiS1+TiS2+Eqd \quad (1).$$

Tpd is the propagation delay in the optical fiber 201 extending between OLT 202 and ONU 204. The Ts delay is the basic transmission delay or ONU digital process latency, and is defined as the Upstream cell transmission delay. The Ts delay, for example, may be determined by comparing the first grant of the first PLOAM cell in the downstream frame to that downstream frame's receipt at the ONU phase specification point, i.e., when the equalization_delay (Eqd) is 0. The Ts delay is due to GPON signal processing in the ONU 204. The equalization-delay (EqD) is an internal delay in the ONU 204, set and controlled by the OLT 202 to synchronize the upstream bursts from the ONUs/ONTs. At the ONU 204 side, TiO1 and TiO2 represent conversion delays for opto-electrical converter 206 and electro-optic converter 208, respectively. At the OLT 202 side, the TiS1 and TiS2 delays represent conversion delays for opto-electrical converter 210 and electro-optic converter 212, respectively.

From formula 1 above, we can represent the response time of the ONU 204 at the reference point S/R by the following relationship:

$$T_{response}=TiO1+Ts+EqD+TiO2, \quad (2)$$

which reduces to the following when EqD=0, $$T_{response} = TiO1 + Ts + TiO2 \quad (3).$$

The maximum round-trip delay of a PON is about 200 μs (equal to 20 km optical fiber) and the overhead processing delay (Ts+TiO1+TiO2+TiS1+TiS2) is to be lower than 50 μs. The value should start from 0 or some predefined value when ranging a new ONU/ONT. The delay between the PLOAM cell with the first grant and the corresponding upstream cell is defined as the equalization-trip delay.

Figure 3:
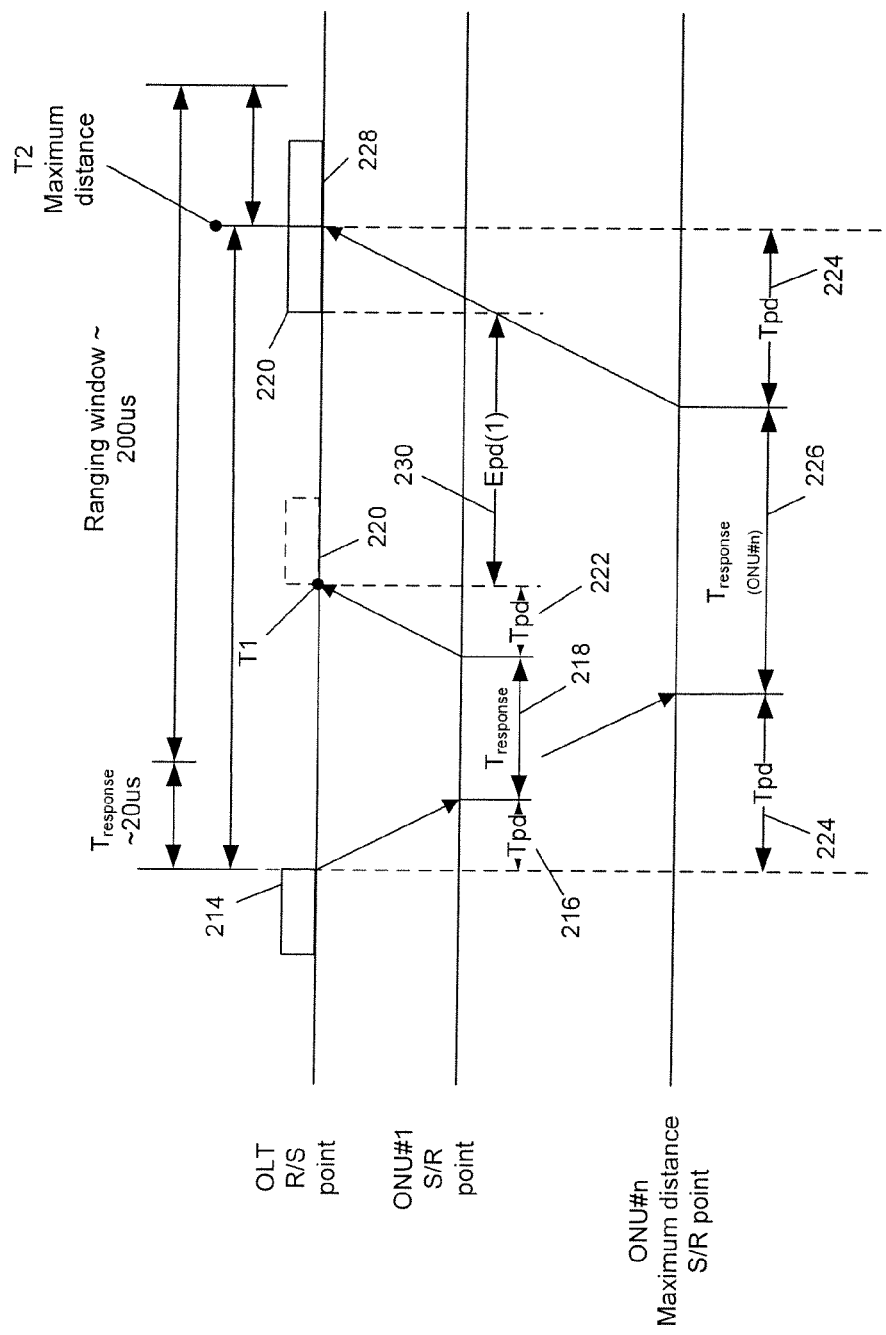
FIG. 3 is a schematic diagram of a ranging operation between an optical line termination device and an optical network unit in a passive optical network.

FIG. 3 shows a ranging window scheme when the ranging grant is located in the first grant field in the first PLOAM cell of the downstream frame. To open a ranging window, the OLT 202 sends an upstream overhead message 214 that indicates to new ONUs which overhead they are to use. Upon receipt of the ranging grant, each ONU/ONT sends a ranging PLOAM cell to the OLT 202. FIG. 3 shows the optical fiber delay (Tpd) delay 216 representing the difference between the transmission of the upstream overhead message and the receipt of that message at a first ONU (ONU#1). Tresponse 218 reflects the processing delay at ONU#1 before a PLOAM ranging cell 220 is sent to the OLT. A second fiber delay (Tpd) 222 reflects the upstream optical fiber delay, and would typically be the same as the downstream fiber delay 216. Without an equalization delay, that PLOAM message 220 would be received at the OLT at time T1. The OLT however desires to have all upstream bursts received in a continuous, contiguous manner. Therefore, the ranging process continues until the full ranging window is calculated. The activation protocol thus determines the length of time to fully receive a responsive PLOAM ranging cell from the furthest ONU/ONT on the GPON, which is characterized by the corresponding optical fiber delays 224, 224, and Tresponse time 226, as shown. The result is PLOAM message 228 from the ONU#N and received at time T2. The OLT then determines the equalization delay, Eqd, for ONU#1 that will synchronize the burst messages from the ONU#1 to be contiguous with those of ONU#N. In the illustrated example this means setting an Eqd 230 for ONU#1 (Eqd(1)) as shown.

Although only the single ONU 204 is shown, it should be understood that the GPON 200 may have numerous ONUs/ONTs (not shown), each with different distances from the OLT 202. The activation protocol sets the upstream phase of each ONU to be the same. Thus, each ONU's Eqd is set such that all ONUs/ONTs will have the same equalized round trip delay (Teqd). As a result, the Teqd for the ONU 204 must be the longest distance ONU plus some margin value, so for a certain n ONU, the equalized delay is:

$$Eqd(n) = Teqd - RTD(n) \quad (5).$$

In the normal operating state, Teqd is constant for all ONUs/ONTs. Allowing for the variation of Tpd and $T_{response}$, the maximum value for Eqd is specified below:

$$Eqd \geq 32000 \text{ bits (at 155.52 Mbits/s)}$$

$$Eqd \geq 128000 \text{ bits (at 622.08 Mbits/s)}.$$

It will be understood that in addition to computing the above listed values, the activation protocol may decrease or increase the equalized delay, Eqd during operation. For example, one type of offset, specifically to compensate for aging and temperature changes, is a drift time compensation that may be added to (or reduced) from the Eqd by the OLT using a ranging time message of the PLOAM block in a downstream frame format.

Typically, the activation process is controlled by the OLT 202, and the ONU 204 responds to the messages initiated in the OLT 202. As discussed above, through this activation protocol, the ONU 204 may adjust transmission optical power level to that required by the OLT 202. The OLT 202 may perform serial number discovery on the ONU 204 or assign an ONU_ID to the ONU 204, as discussed above. The OLT 202 measures the arrival phase of the upstream transmission from the ONU 204, and notifies the ONU 204 of the determined equalization delay, while the ONU 204 adjusts the transmission phase to the notified value accordingly. This procedure may be performed by the exchange of upstream and downstream flags and PLOAM messages. And once this ranging for the ONU 204 has occurred, the OLT 202 can update the equalization delay based on received transmission phase information.

For implementations according to the ITU-T GPON specifications, the RTD must be within an allowed-ranging-variance, which is N bits according to the upstream bit rate, compared to the last successful RTD measurement. That bit variance is as follows for the three defined upstream bit rates: 1.244 Gbits/s—8 bits; 622 Mbits/s—4 bits; 155 Mbits/s—1 bit.

In part to ensure ranging variance compliance, the activation protocol determines the RTD based on two successive measurements. For a successful RTD measurement, the RTD is the average of the two successful measurements. For a failed RTD measurement procedure, an alarm is asserted at the ONU/ONT and the ONU/ONT is deactivated (Deactivate_ONU_ID), thus moving the ONU/ONT back to an Initial-state(01).

There are two issues with the current proposed frame synchronization scheme and core interface. First, for downstream data, the clock data recovery latency could be ignored with certain compensations on the Eqd, but the clock jitter or phase detection logic at the ONU could still erroneously add (either positively or negatively) bits to the timing signal, affecting synchronization. This bit variability can be particularly problematic given that the byte alignment logic has to be always locked with the same relationship to the physical synchronization (Psync) in the downstream frame format and byte distance, even after a loss of frame (LOF) or loss of signal (LOS), otherwise the OLT will set its alarm and deactivate the ONU, thus indicating that ranging and activation has failed.

Second, for the upstream burst logic, the time to enable the upstream data transmission has to have a resolution down to the per-bit level, which means that the current 16-bit interface is not adequate to meet the upstream RTD allowed-ranging-variance variation requirements in the GPON specification, which have the above referenced bit variability depending on the upstream configuration: 1.244 Gbits/s—8 bits; 622 Mbits/s—4 bits; 155 Mbits/s—1 bit. Therefore, to meet the specification, the 16-bit interface to serialize/deserializer typically requires a small elastic buffer and "kick counter." Here, the preloaded count-down counter is triggered when the upstream enable signal has been detected, and after the kick timer reaches zero, the transmitter starts to transmit out the data streams. This process however is undesirable because it requires the addition of at least 12.86 ns, 16-bit time at 1.244 GHz for a laser transceiver to emit light.

Figure 4:
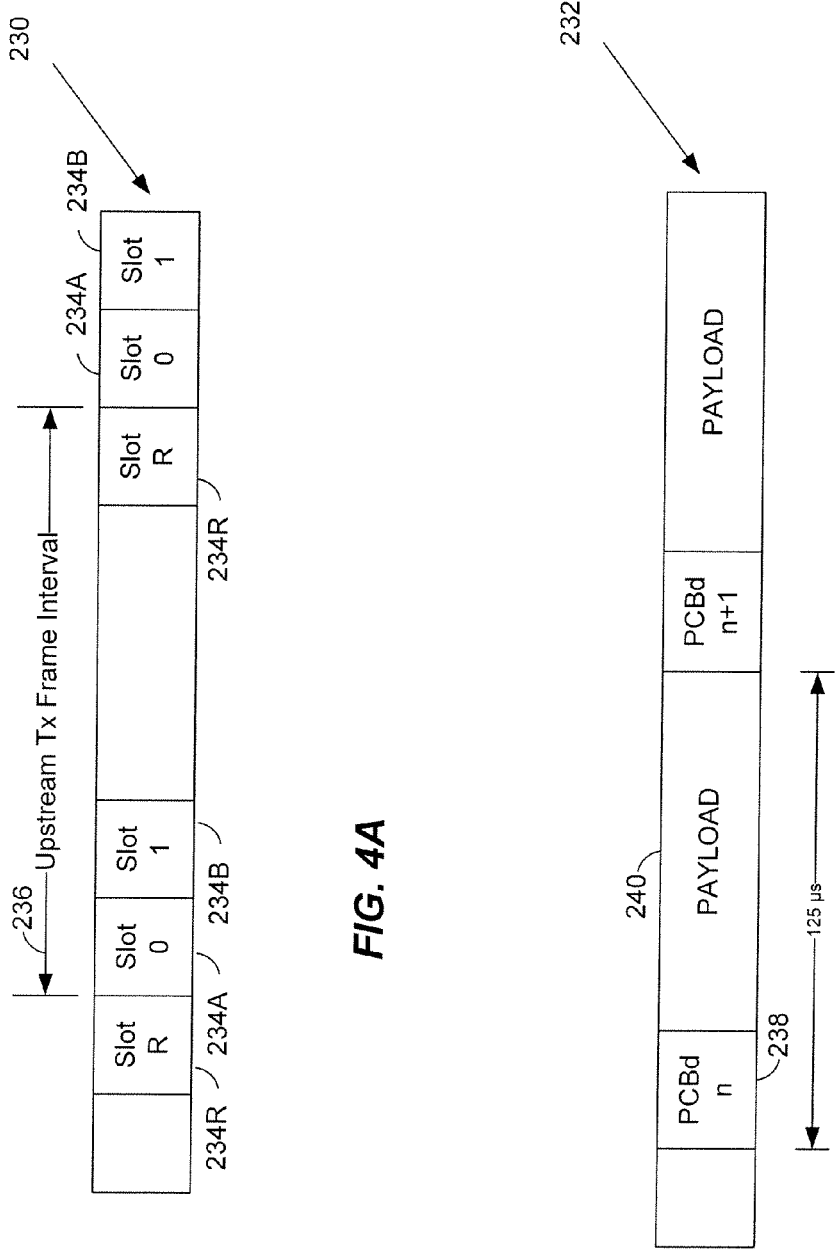
FIGS. 4A and 4B illustrate general upstream and downstream transmission frame formats, respectively.

FIGS. 4A and 4B show a high-level example upstream frame 230 (from ONU/ONT to OLT) and a high-level example downstream frame 232 (from OLT to ONU/ONT), respectively. The frame 230 includes a frame slot 234 (labeled 234A through 234R) for each representing an upstream burst from an ONU or ONT (of which there are R+1). As will be appreciated, each slot 234 may include a Physical Layer overhead (PLOu) time, which includes the time required for tolerances (guard time), receiver recovery, signal level recovery, timing recovery, and a delimiter. Each burst slot 234 may further include Power Leveling Sequence (PLSu) data, PLOAM upstream (PLOAMu) data, Deterministic Bit Rate upstream (DBRu) data, and of course the payload.

The total number of devices coupled to the OLT determines an upstream virtual frame interval 236 which is equal to the total number of time slots required to communicate with each and every ONU or ONT device on an OLT network, which in this example would be every ONU or ONT coupled to the OLT. The length of the interval however may be based on fewer than all of the ONUs/ONTs, for example, where it has been determined that a device is not operating properly. The frame interval 236 only includes slots for each of the ONU/ONT devices, therefore in the illustrated example each new frame interval 236 starts with a different Slot 0 burst, 234A, respectively.

Referring to FIG. 4B, the downstream frame 232 includes a physical control block downstream (PCBd) 238 and a payload 240, which may include an ATM partition and/or the GEM partition. The downstream frame provides the common time reference for the PON, and provides the common control signaling for the upstream transmission. In the illustrated example, the length of downstream frame 242 is 125 μs, which would coincide with the upstream virtual frame TX interval.

Figure 5:
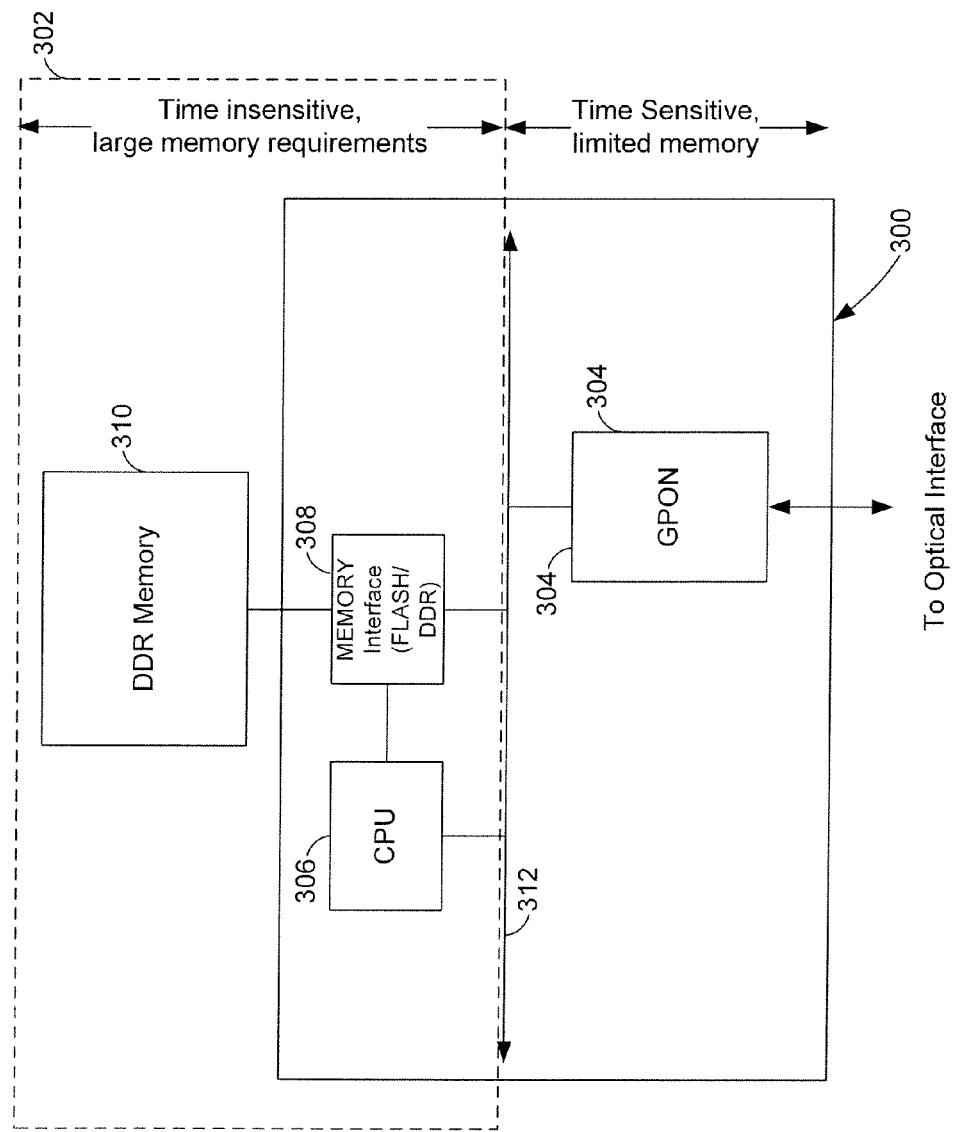
FIG. 5 is a high level block diagram of an example architecture of an integrated circuit within a passive optical network device, such as may be used for an optical network unit device or an optical network termination device.

FIG. 5 is a block diagram of an example of an architecture 300 that may be implemented in an ONU or ONT, such as those shown in FIG. 1. Generally, the architecture 300 includes a sub-system 302 that may be used to execute certain functions, such as non-time sensitive functions that require large memory requirements or low latency, and integrated circuits 304 having an embedded processor for performing certain other functions, such as time-sensitive functions that may only need limited memory. Time-sensitive versus non-time sensitive functions may be determined based on time threshold or response threshold requirements for processing the functions. For example, some functions, such as Media Access Control (MAC), may require immediate response (i.e., fast response threshold, time sensitive), whereas other functions, such as TCP/IP routing or packet processing, may not require an immediate response (i.e., non-time sensitive). It is recognized that in practice the actual response time for some non-time sensitive functions may be comparable to the response time threshold of time-sensitive functions. However, it should be understood that it is the response time requirements (e.g., time threshold requirements) that establish whether a function is time-sensitive or not, rather than the actual response time seen in practice. As such, the time threshold requirements delineating between time-sensitive and non-time sensitive are not necessarily predetermined or static, but are rather based on the allowable response time for executing the function. The integrated circuit 304 is described in example implementations further below and it is noted that the memory storage on the circuit may be achieved entirely by small memory modules, such as first in first out (FIFO) memory buffers, and of sufficient size to store packet data as it is received. Example embodiments and further details are discussed in U.S. application Ser. No. 11/877,379, entitled "Processing Architecture for Passive Optical Network", filed on Oct. 23, 2007, the entirety of which is hereby incorporated by reference.

In a GPON context, the circuit 304 may process various subfields in overhead data in a received transmission, and prior to offloading payload information to the subassembly 302. The integrated circuit 304 may identify the corresponding incoming downstream frame formats for the particular ONU/ONT and the location, length and value of the various subfields contained in the overhead field. On the transmitter side, the integrated circuit 304 may create the transmitted data overheads based on information from the receiver side as well as information (such as payload information) from the subassembly 302. In fact, one of the benefits of the architecture 300 is that in some examples information obtained from processing the received data may be used to directly control processing of transmitter data without resorting to offloading all such data retrieval and reconstruction to the subassembly 302. In this way, internal delays in a processing unit of a PON (e.g., an ONU or ONT) may be reduced. Further, because clock data recovery may be performed within the integrated circuit 304 and communicated directly with the transmitter within the integrated circuit 304, the architecture 300 may be used to more accurately correct for internal delays.

Additional attendant potential benefits will be apparent. For example, by using the integrated circuit 304 as a pre-processor for the subassembly 302, the architecture 300 may be able to perform error correction and detection on a receiver side and instruct a transmitter side to send responsive data, prior to offloading payload to the subassembly 302, or at least without concern for whether the offloaded payload has been processed by the subassembly 302. This ability may be particularly useful in a ranging context, where an OLT is attempting to locate an ONU/ONT and properly synchronize its data. Furthermore, this ability may be useful when there are problems in the received data. Instead of offloading the payload itself to the subassembly 302 for time consuming calculations on that data, the integrated circuit 304 may identify the data as bad data and corresponding reply to the downstream source, e.g., the OLT.

The subassembly 302 may be provided as part of a system-on-a-chip (SoC) which may be re-usable for a variety of different implementations, including implementation of different integrated circuits as discussed below. As such, the subassembly 302 provides a "snap-and-run" architecture in which a variety of chips may be coupled to the subassembly 302, and the subassembly 302 is not limited to ONUs 104/ONTs 108, much less the example provided herein. The subassembly 302 may therefore be used to reduce the time-to-market chip assembly, as it can be used among a variety of chip designs and to build different chips.

Generally, the subassembly 302 includes a SoC processor 306 for processing the non-time sensitive functions and a memory interface 308 coupled to the SoC processor 306. A memory 310 is further provided and coupled to the memory interface 308 for buffering data from the integrated circuits 304 (e.g., packet buffering) and may include embedded memory management. The memory 310 thereby stores data for execution of non-time sensitive functions to be processed by the SoC processor 306. The SoC processor 306 controls the memory 310 and movement of data packets in and out of the memory 310 as needed.

The SoC processor 306 and the memory 310 are provided external to the integrated circuit 304 to support the processing of non-time sensitive functions while the processing of time-sensitive functions is handled by the integrated circuit 304. Accordingly, the SoC processor 306 and memory 310 may be used to minimize the amount of processing required at the chip level (e.g., packet level). That is, non-time sensitive functions that require additional processing complexity may be passed from the integrated circuits 304 to the subassembly 302. Different types of memories may be used for the memory 310, including double data rate (DDR) memory, flash memory, etc. The memory interface 308 may be provided as an interface corresponding to the memory 310 (e.g., a DDR memory interface, flash memory interface, etc.). The subassembly 302 may further include additional components, such as a debugging port, e.g., joint task action group (JTAG) port, an input/output interface (e.g., a general purpose input/output (GPIO), or a receiver and/or transmitter, e.g., universal asynchronous receiver/transmitter (UART). The integrated circuit 304, which may be a GPON chip 304, communicates with the SoC subassembly 302 through an interface coupled to the backplane bus 312. Further disclosure of the GPON chip 304 is provided by way of example below. Generally, the GPON chip 304 includes an internal processor, and a SoC interface to the SoC subassembly 304 which interfaces with the SoC processor and with the memory 310 via the memory interface 308. It should be understood that while the architecture 300 is described with reference to particular components, integrated circuits and particular transmission standards, the architecture 300 may be readily applied to different components and standards where time-sensitive and non-time sensitive functions may be applicable, including, but not limited to, wireless and wireline technologies.

Figure 6:
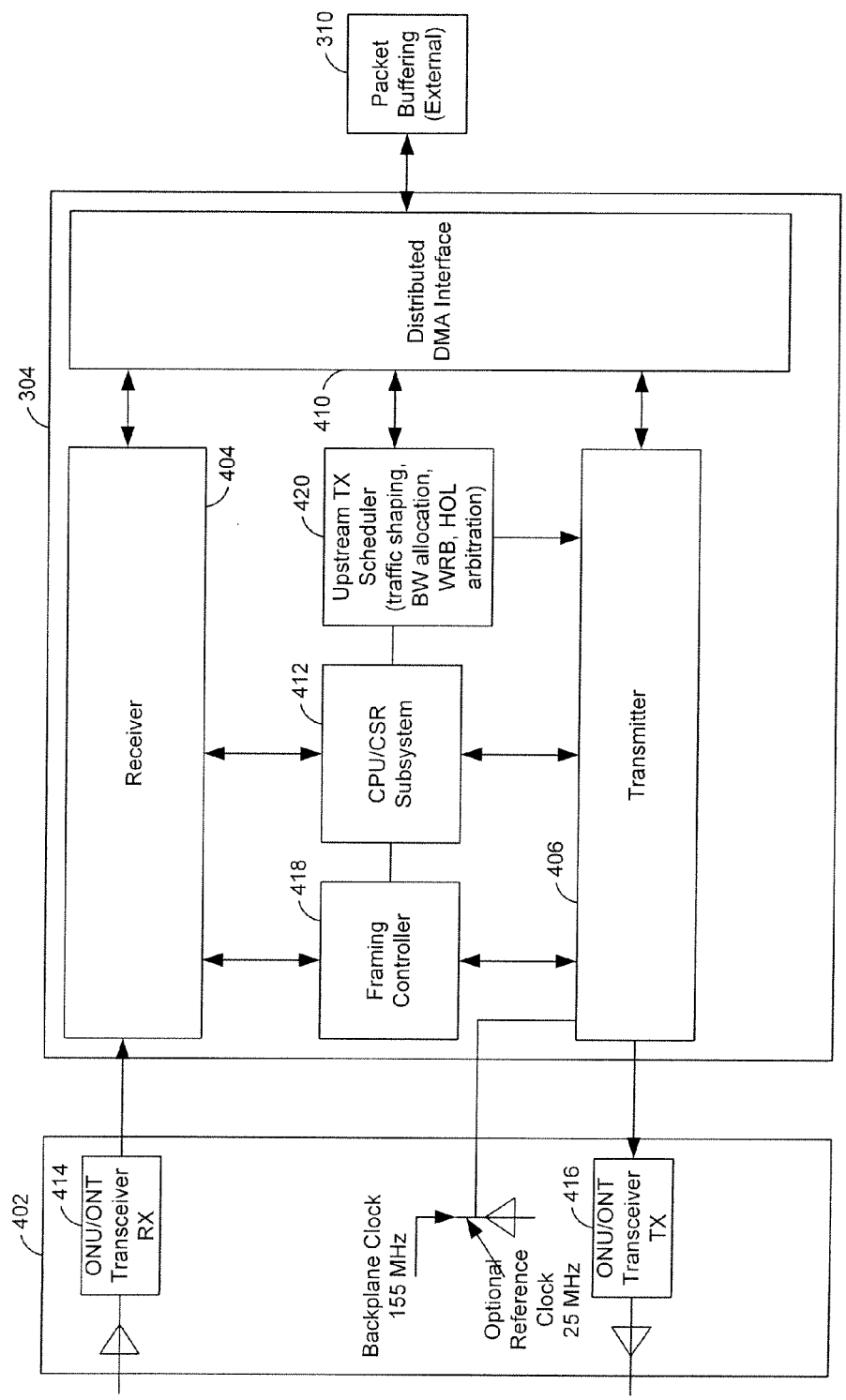
FIG. 6 is a block diagram of an example gigabit passive optical network chip of the integrated circuit within the passive optical network device shown in FIG. 5.

FIG. 6 illustrates a block diagram of an example of a GPON chip as the integrated circuit 304 and which may be used in the ONU 104 or ONT 108. The chip will be described in the context of the Gigabit PON Transmission Convergence (GTC) frame formats as set forth in the GPON specification ITU-T Recommendation G.984.3. In particular, the GPON chip 304 is coupled to the passive optical network 100 via an optoelectronic transceiver interface 402, and includes a receiver 404 for receiving downstream transmissions from the OLT 102, a transmitter 406 for assembling and transmitting upstream burst transmissions to the OLT, a distributed direct memory access (DMA) interface 410 to interconnect with the subsystem 302, and an internal processor 412 for processing certain functions (such as time-sensitive functions) associated with the transmission, such as processing the overhead of downstream transmission and assembling the frame of an upstream burst transmission.

The optoelectronic interface 402 generally includes an optoelectronic transceiver receiver 414 coupled to the receiver 404, and an optoelectronic transceiver 416 coupled to the transmitter 406, though it should be understood that different optoelectronic interfaces may be used. Upstream GTC frame formatted data is transmitted from the ONT 108/ONU 104 over the fiber 106, 110, respectively, from the transceiver 416. Downstream GTC frame formatted data is transmitted from the OLT 102 to the transceiver 414 over the fibers 106 and 110.

The receiver 404 generally conforms to the downstream transmission format used by the OLT 102, such as the downstream GTC frame format provided above. In the example provided, the receiver 404 may include a clock and data recovery (CDR) unit discussed below that receives the downstream transmission via the transceiver 414. The CDR recovers the network clock and aligns the data unit with the recovered clock to be provided to the next receiver stage. The CDR unit may also recognize the speed at which the downstream transmission is being transmitted and recovers the particular clock associated with the burst transmission.

The GPON chip 304 may include a framing controller 418 that interacts with the transmitter 406 and the internal processor 412 to control the upstream burst transmissions from the transmitter 406. In processing, the framing controller 418 and the internal processor 412 enable various functions in the transmitter 406 including the formation of the overhead frame for upstream burst transmissions.

The transmitter 406 may generally conform to the upstream burst transmission format used by the ONU/ONT 104, 108, such as the upstream burst GTC frame format provided in ITU-T G.984.3 specification. The transmitter 406 may include ATM and GEM processors that receive information to be transmitted and format the information into the format of the payload field. Generally, the information in the payload is generated externally from the GPON chip 404 and provided to these processors. ATM cells and GEM fragments may be multiplexed together in response to control signals from the framing controller 418.

As the payload data is formatted and multiplexed, the transmitter 406 assembles the header of the downstream transmission frame. The framing controller 418 enables the operations of the transmitter 406, including enabling an overhead frame generator, based upon information from downstream transmissions, such as framing product control. The internal controller 412 may provide traffic shaping data and BW allocation data to an upstream scheduler 420. In response, the scheduler 420 controls traffic shaping, bandwidth allocation, and other transmitter variables.

The distributed DMA interface 410 may provide distributed management of the packet buffer (e.g., external memory 310). In particular, the distribute DMA interface 310 may provide an interface to the sub-assembly 302, and may be implemented in any integrated circuit 304. The distributed DMA interface 410 may include separate egress and ingress engines coupled to a SoC interface, for providing DMA processing independent from the sub-assembly 302.

Data read by the DMA interface 410 from the external memory 310 may be provided to the transmitter 406 via a descriptor and buffer management unit, controlled by the upstream schedule 420. The descriptor and buffer management unit may provide ATM and GEM frame status data to the upstream scheduler 420 for affecting the overhead data to be inserted into the upstream burst transmission. Based on the scheduling data from the upstream scheduler 420, the DMA interface may provide payload data to ATM and GEM processors in the transmitter 406, for example to a scrambler as discussed below.

Figure 7:
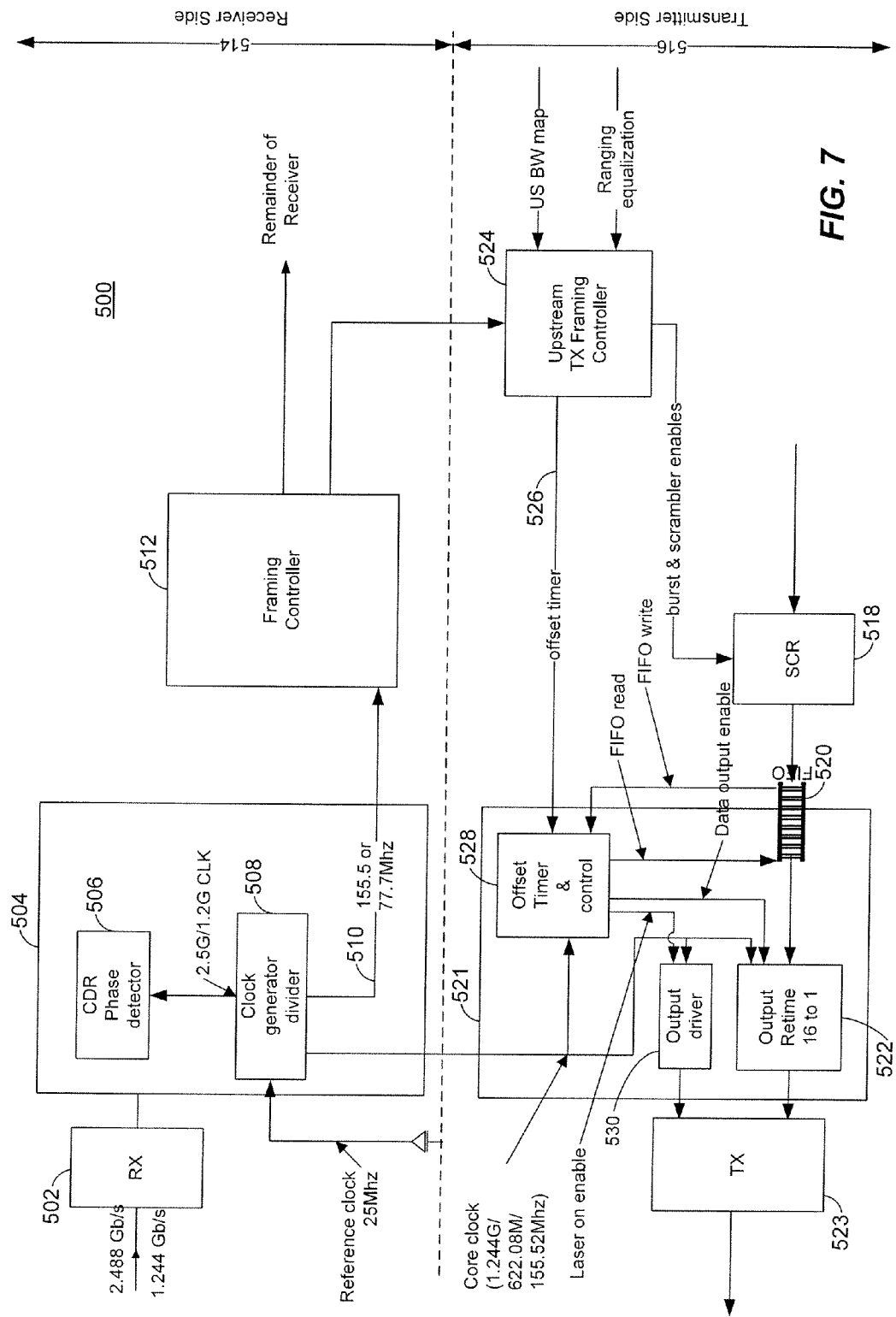
FIG. 7 is a block diagram of an example circuit for adjusting the transmitter clock signal to be used in timing upstream burst transmissions in a passive optical network.

FIG. 7 illustrates circuitry 500 that may form part of the ONU 104/ONT 108, more specifically part of the GPON chip 304 to synchronize upstream burst transmissions by adjusting the phase of data transmission to correct for any timing delay errors. Once activation and ranging has occurred, an OLT transmits downstream frames to the ONU/ONT circuit 500, which receives the frames at an optical receiver 502 coupled to a receiver circuit 504 (only a front end portion of which is shown).

The downstream frames may contain frame headers identifying upstream burst start and stop times of each ONU and ONT, as well as the payload data itself. A clock and data recovery circuit (CDR) 506 is coupled to a clock generator 508 to generate a core clock signal for the ONU/ONT 500, for example, through a phase locking circuit receiving a reference clock signal, in this case a 25 MHz reference clock from the downstream transmission. Persons of ordinary skill in the art will recognize various techniques for core clock signal generation. In the illustrated example, the generator 508 creates either a 77.7 MHz or 155.5 MHz core clock signal 510, which is transmitted to the remainder of the ONU/ONT 500, including a framing controller 512 that identifies the framing information corresponding to the particular ONU/ONT 500 for further processing.

In addition to illustrating a receiver side 514 of the ONU/ONT 500, FIG. 7 illustrates a transmitter side 516 for upstream frame transmission. In particular, for a GPON compliant system, upstream framing information, including overhead information and payload data are provided to a scrambler 518 (e.g., from a DMA interface and upstream framing controller). The scrambler 518 couples the framing information to buffer memory device in the form of a FIFO 520 that buffers the information 16 bits at a time for a serializer/deserializer (SERDES) 521 of the transmitter 516. Framing information from the FIFO 520 is coupled to serializer 522 that serializes the data (from 16 bit wide to 1 bit transmission), and the SERDES 521 controls operation of a laser 523.

An upstream framing controller 524 controls bit accuracy of the timing of the framing information in the FIFO 520. Ranging equalization data for the ONU/ONT 500 (i.e., Eqd (n)) set by the OLT during activation of the ONU/ONT 500, and an upstream bandwidth mapping information (e.g., start stop times for upstream bursting) from the downstream frame is provided to the framing controller 524 for developing phase offset signal in the form of an offset timer data 526. The offset data 526 reflects the timing delay for the ONU/ONT 500 and may be based not only on previously determined ranging information but any combination of timing delay, such as jitter error, operational drift, setup times, etc. The framing controller 524 transmits the offset timer 526 to an offset timer and control circuit 528 in the SERDES 521. The control circuit 528 uses the offset to control the operation of the serializer 522 by adjusting the core clock signal from generator 508 to compensate for any timing delays and ensure that the upstream burst information is within the specified variance range. The control circuit 528 is coupled to control both the FIFO 520, supplying a FIFO read instruction to begin reading framing data out of the FIFO 520 and a data enable signal to the serializer 522 and a laser enable signal to the laser output driver 530 controlling the laser 523. Thus, the offset timer data 526 is able to instruct the SERDES on when to begin submission of the upstream burst frame information to ensure that such information is properly synchronized with the OLT.

The example of FIG. 7 uses the SERDES 521 to generate an offset clock on the transceiver side 416, based on the core clock signal from the generator 508 and the calculated offset timer. That is, in the configuration of FIG. 7 the offset clock, which differs on the transceiver side from that generator on the receiver side, must be calculated in the SERDES 521.

Figure 8:
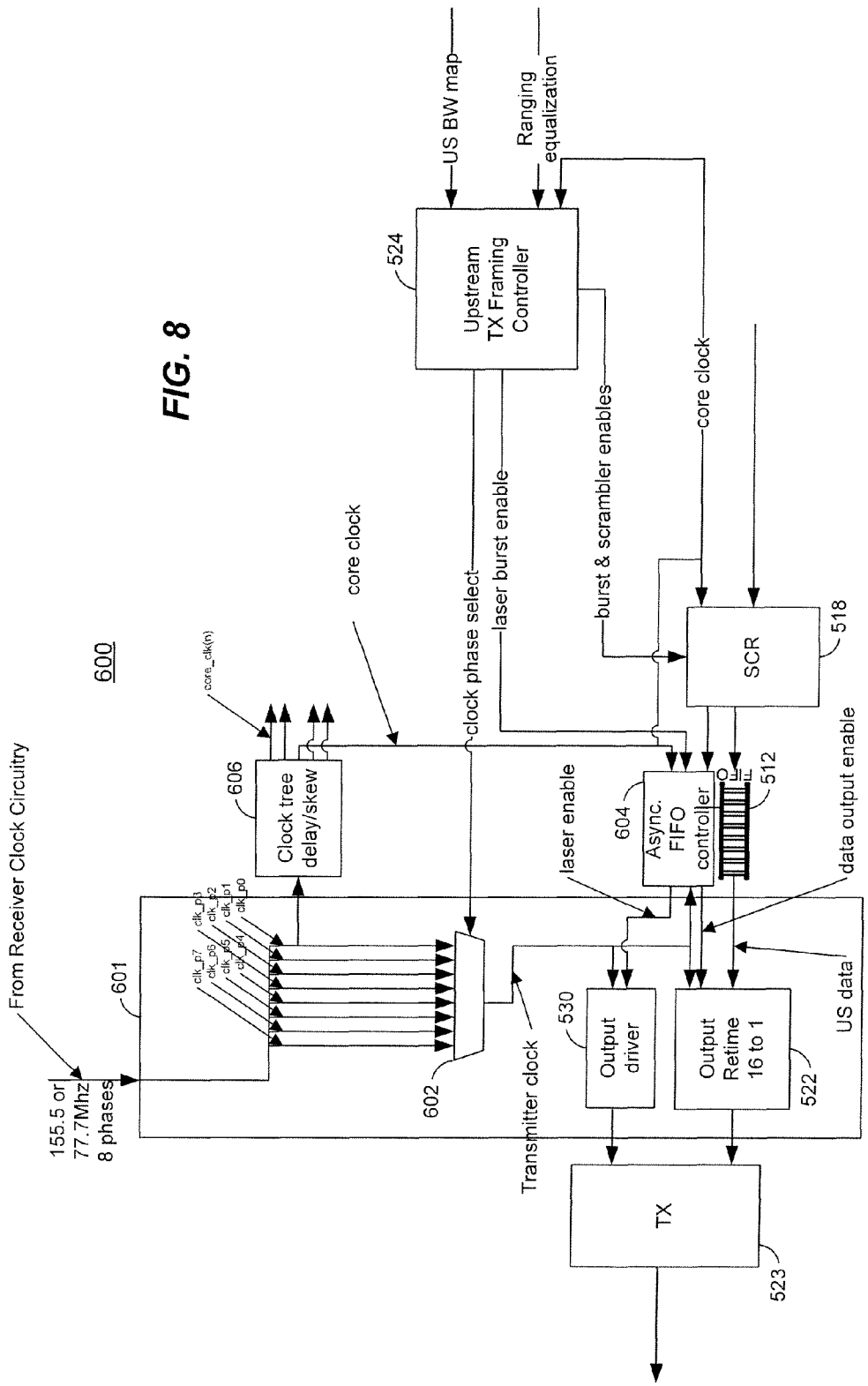
FIG. 8 is a block diagram of another example circuit for adjusting the transmitter clock signal to be used in timing upstream burst transmissions in a passive optical network.

FIG. 8 illustrates another example implementation of an upstream burst circuit module 600, where like reference numerals to FIG. 7 are used where applicable. Instead of having a transmitter serializer/deserializer (SERDES) 601 generate the correct offset clock signal from the core clock signal, equalization delay, etc., the module 600 uses the framing controller 524 to select from among phase-offset clocks created in the receiver side 514 by the CDR 506 during sample and recover. The core clock signal and the 8 phase-offset clocks used to determine that core clock signal are sent from the receiver side clock circuitry (CDR 506 and clock generator divider 508) or SERDES to the transmitter SERDES 601. The framing controller 524 sends a phase offset signal in the form of a clock phase select signal to an 8-to-1 demultiplexer 602 to select a clock based on the core clock signal and the 8 phase offsets, after which the selected clock is provided to a FIFO controller 604 and to the serializer 522. The FIFO controller 604 may be an asynchronous controller and may provide a laser enable signal to the laser driver 530 and a data output enable signal to the serializer 522, which is also coupled to the FIFO 520 for receiving the upstream framing information.

A clock tree delay/skew circuit 606 sends the clock signal to the controller 604 and the other circuitry, as desired.

FIG. 8 shows an example where the framing controller 524 selects from among 8 phase-offset clocks. However, the module 600 could be implemented with any number of phase-offset clocks generated in the receiver side 514 from the sample and recover clock generation process. Thus, even higher resolution control would be achieved by using 16 phase-offset clocks. Higher resolution may be desired in some examples, because if the receiver side SERDES only operates at 8 phase-offset clocks the upstream starting bit resolution is only down to 2-bit, as the incoming frame information is 16 bit based. Using 16 phase-offset clocks that bit resolution is improved to the per-bit level. Because the core clock for the circuit 600 is derived from one of the 8 phase-offset clocks (i.e., clk_p0-clk_p7) the relationship between the transmitter clock and the digital core clock may be fixed, meaning that they will share the same clock or have clocks offset by a predetermined amount.

While at least in some instances, the configuration 600 will provide improvement over the configuration 500, e.g., by using phase-offset clocks already generated at the receiver side during the sample and recovery clock generation process, there is the possibility that the transmitter clock signal for the transmitter SERDES 601 could have "glitches" due to the 8-phase clock selection. Therefore, it may be desirable to perform the clock switching when the laser 523 is off.

Figure 9:
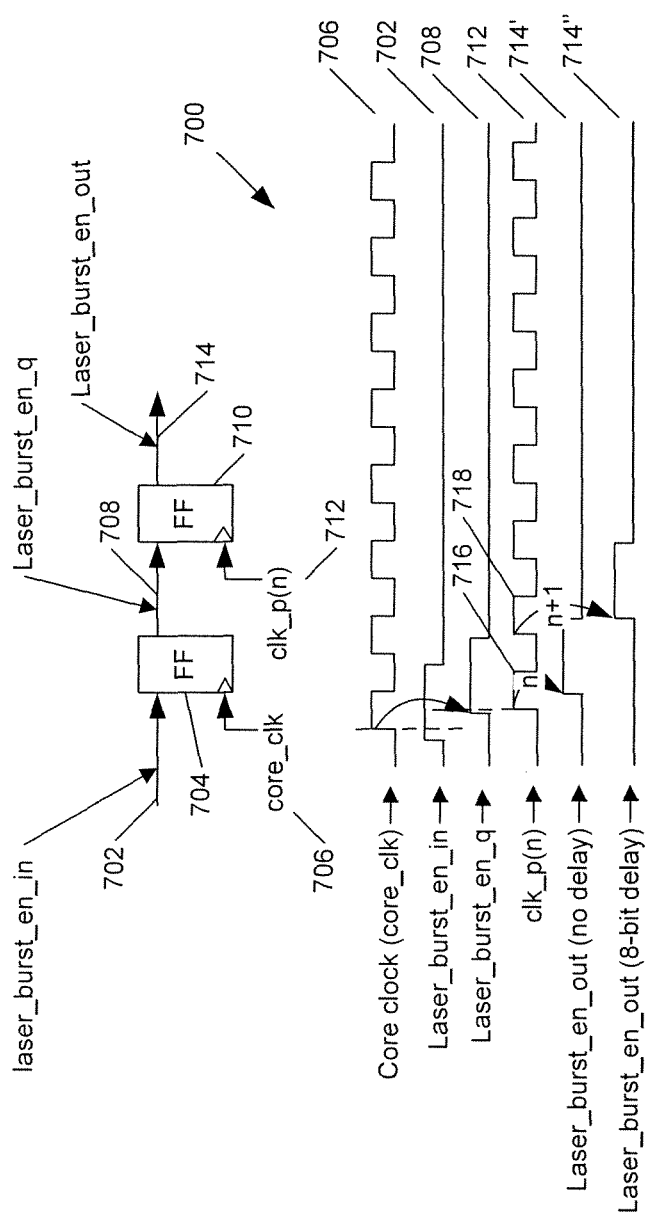
FIG. 9 is a timing diagram showing the core clock signal (core_clk) and offset transmitter clock signal (clk_p(n)) for the example circuit of FIG. 8.

FIG. 9 illustrates an upstream data skew timing diagram 700 for the synchronization of an input laser burst enable signal coupled to a first flip flop FF 704 along with a core clock (core_clk) signal 706 for producing a laser burst enable q signal 708 that is coupled to a second FF 710 along with the selected transmitter side phase-offset clock signal, clk_p(n) 712. The FF 710 produces an output laser burst enable signal 714 that is used to drive the laser output driver. The timing of these signals is illustrated below the FF connection diagram.

The core clock signal 706 (i.e., the ONU/ONT clock signal) developed by the receiver SERDES clock circuitry latches the laser burst enable signal 702 into the FF 704. The laser burst enable q signal 708 is delayed by an FF delay, and because of the phase-offset clock determination made by the framing controller, the q signal 708 is transmitted to the FF 710 at the same time as the clk_p(n) signal 712. The result is that a laser burst enable output signal having no delay is shown as 714', delayed only by the setup time of the FF 710.

While the laser burst signal 714' represents the enable signal when there is no time delay (beyond the setup times attributed to the FFs 704 and 710), in a GPON implementation where, for example, an 8 bit variance delay is allowed for upstream bursts at 1.244 Gbits/s, the laser burst enable output signal may vary in time up to 8 bits for a 1.244 Gbits/s upstream bandwidth. A laser burst enable out signal 714" shows the result of such an 8 bit delay. In this way, the upstream burst framing information could be latched at clock n 716 or clock n+1 718 and still be within the allowed 8 bit variance delay.

Figure 10:
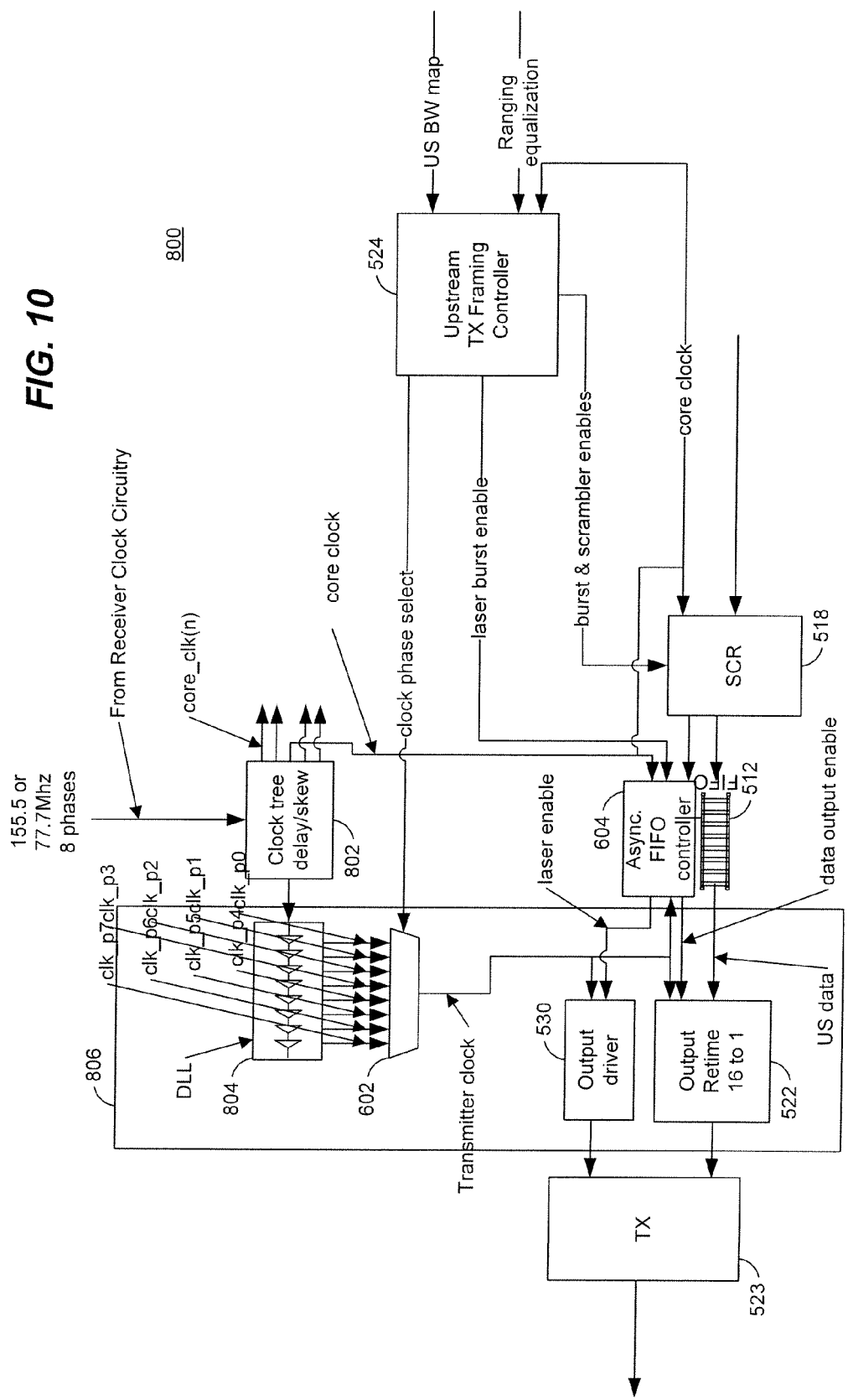
FIG. 10 is a block diagram of yet another example circuit for adjusting the transmitter clock signal to be used in timing upstream burst transmissions in a passive optical network.

FIG. 10 illustrates another example implementation of an upstream burst module 800 with like reference numerals from FIGS. 7 and 8 retained for the reader's convenience. The configuration of module 800 differs from those described above because it uses the core clock signals (core_clk) which are buffered, delayed and skewed at a controller 802 that acts as a source clock for a DLL 804 inside a transmitter side SERDES 806. The controller 802 receives the core clock signal and provides its DLL circuitry 804, which takes the core clock signal (core_clk) and, in the illustrated example, generates up the 8 phases of clocks which are then selected by the upstream framing controller 524 after each ranging process issued by the OLT. The controller 802 provides the core clock signal to the FIFO controller 604 like that of the clock skew controller 606 of FIG. 8.

In the module 800, the phase-offset clocks produced by the DLL 804 will have fixed delays from the core_clk with guarantied enough setup time to latch the control signals. With the module 800, only one clock signal, the core clock signal, is needed from the receiver side. The transmitter side does not need phase-offset clock data from the receiver side, but rather instead the DLL 804 sets the desired phase-offset clock under control of the framing controller 524.

Figure 11:
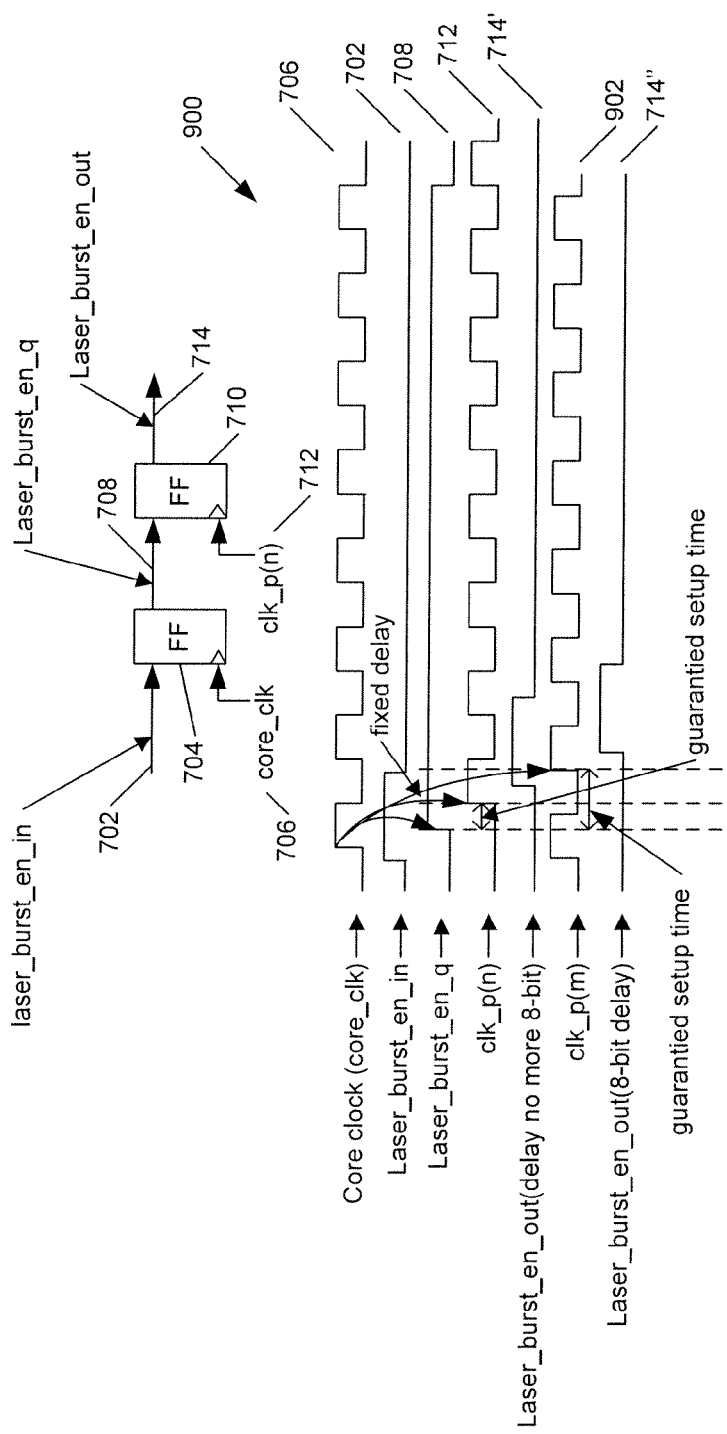
FIG. 11 is a timing diagram showing the core clock signal (core_clk) and offset transmitter clock signal (clk_p(n)) for the example circuit of FIG. 8.

FIG. 11 illustrates a functional and timing diagram 900 showing the upstream scheme for the module 800, where like reference numerals to those of FIG. 7 are used where applicable. In the illustrated example the clk_p(n) signal is delayed from the burst q signal 708 by a guarantied setup time corresponding to that of FF 710. A second clk_p(m) signal 902, for a different selected phase-offset clock, is shown. As indicated, this phase-offset clock signal will also be timed with a guarantied setup time delay from a leading edge of the laser burst q signal 708, thus indicating that the each of the phase-offset clock signals will be timed to compensate for setup time delays and ensure that the laser burst enable output signal is timed.

In determining the phase-offset clock, a number of factors are to be considered, as there are quite a few sources of variance that may affect the upstream framing information. These sources include, downstream CDR bit skew, due to the clock extraction, ONU jitter generation and consecutive identical digit (CID) immunity. The factors also include downstream frame synchronization jitter. In the worst case, the synchronized 16-bit data can be ahead or trail late up to one full core cycle, i.e., 16 bits worth of time. Also, the OLT could dynamically re-assign the upstream bandwidth window (US BW window) at any boundary or byte accuracy. In such a situation, the upstream burst module would have to add or subtract 8 bits of time from the offset timer based on the new starting time. Upstream data output re-timing logic could contribute up to one bit skew. Laser transceiver latency could introduce delay, and the upstream burst module would have to accommodate various laser modules for compatibility issue, where each laser module could be associated with a different laser transceiver latency. The OLT could recalculate/update the equalization delay due to ONU's upstream transmission drifting, e.g., resulting from fiber aging or temperature changes, and this would have to be accounted for by the upstream burst module. Some of these skew values on the downstream clock signal may be incorporated into the equalization delay for the particular ONU/ONT.

FIGS. 7-11 illustrate example techniques for adjusting the upstream burst clock to synchronize upstream burst information with the OLT clock. A clock signal from the receiver side is used as the basis for setting a transmitter clock signal offset to correct for delays and skews on the clock signal. While a core clock is used to move 16 bits of data at a time and into a FIFO for transmission. The output release of such data is adjusted by applying a phase offset having a higher resolution than that of the core clock. Thus the framing information to be burst to the OLT is serialized at the timing output driver connected to output of FIFO with a finer clock resolution to allow for a more accurate clock to be used for upstream communication.

While the above techniques are discussed in terms of 8 and 16 bit resolutions on the upstream burst clock, it will be understood that 100s of phases of clock offset may be selected from by a framing controller, that is, the system is not limited to a particular phase resolution. Furthermore it should be noted that the resolution may occur within a single clock cycle or across numerous clock cycles. In the typical configuration, course clock adjustment occurs from a CDR and sample and recovery process where the core clock is set based on the received downstream framing information. In a GPON system one clock cycle may be 16 bits wide, which means that a full variation in a clock cycle would be unacceptable variance for an ONU/ONT communicating with an OLT. The specification lists variances of 8 bits, 4 bits, or 1 bit depending on the upstream bandwidth. But with the above techniques, bit variations may be limited to the allowed number of bits by adjusting the sub-cycle (phase) accuracy of the clock.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for controlling timing of a transmission signal from a network termination device having a receiver and a transmitter, the method comprising:
   receiving a signal at the receiver of the network termination device, the signal having been transmitted in accordance with a predetermined bit rate;
   recovering a reference clock based on the signal received at the receiver;
   determining a core clock signal for the receiver based on the recovered reference clock; and
   communicating the core clock signal to the transmitter of the network termination device; and
   at the transmitter of the network termination device,
      generating a phase adjusted clock signal, and
      setting the phase adjusted clock signal as the transmitter clock signal,
   wherein the transmitter clock signal is offset from the core clock signal, and wherein the transmission signal is transmitted from the transmitter of the network termination device based on the transmitter clock signal.

2. The method of claim 1, further comprising using the transmitter clock signal to control each of:
timing of a serializer in the transmitter; and
timing of a laser output driver in the transmitter.

3. The method of claim 1, wherein the phase adjusted clock signal is generated in a delay lock loop of a serializer in the transmitter.

4. The method of claim 3, further comprising:
determining a clock phase select signal; and
communicating the clock phase select signal to the serializer to generate the phase adjusted clock signal as the transmitter clock signal.

5. The method of claim 4, wherein the clock phase select signal is determined in an upstream framing controller of the transmitter.

6. The method of claim 1, wherein the network termination device is an optical network unit (ONU).

7. The method of claim 1, wherein the network termination device is an optical network termination (ONT).

8. An apparatus for controlling timing of an upstream transmission from an optical network termination device to an optical line termination device in a passive optical network, the apparatus comprising:
a receiver to receive a downstream transmission from the optical line termination device, and to analyze the downstream transmission to recover a reference clock, and to determine a core clock signal for the receiver based on the recovered reference clock; and
a transmitter to (i) form the upstream transmission based on processing of the downstream transmission, and (ii) produce a phase offset signal to control conversion of the core clock signal to a transmitter clock signal offset, the transmitter including
a phase adjusted clock signal generator to receive the core clock signal from the receiver and generate a transmitter clock signal, and
an upstream framing controller coupled to the phase adjusted clock signal generator to control phase of the transmitter clock signal,
wherein the transmitter clock signal offset is used in timing the transmission of the upstream transmission.

9. The apparatus of claim 8, further comprising:
a laser driver coupled to a laser signal source; and
a serializer to receive the upstream transmission prior to transmission, wherein the laser driver and the serializer are coupled to the phase adjusted clock signal generator to receive the transmitter clock signal.

10. The apparatus of claim 9, wherein the phase adjusted clock signal generator comprises a delay lock loop in the transmitter.

11. A network termination device comprising:
a first transceiver to receive a downstream transmission having a first bit rate;
a receiver circuit coupled to the first transceiver, the receiver circuit to recover a reference clock based on the downstream transmission and to determine, based on the recovered clock, a core clock signal for the receiver circuit;
a transmitter circuit to form an upstream transmission, the transmitter circuit having a transmitter clock signal to be used in transmitting the upstream transmission, wherein the transmitter clock signal is offset from the core clock signal, wherein the transmitter circuit includes
a phase adjusted clock signal generator configured to (i) receive the core clock signal from the receiver circuit and (ii) generate the transmitter clock signal, and
an upstream framing controller configured to control generation of the transmitter clock signal; and
a second transceiver to communicate the upstream transmission.

12. The network termination device of claim 11, further comprising:
a laser driver coupled to a laser signal source; and
a serializer to receive the upstream transmission prior to transmission, wherein the laser driver and the serializer are coupled to the phase adjusted clock signal generator to receive the transmitter clock signal for enabling operation.

13. The network termination device of claim 11, wherein the phase adjusted clock signal generator comprises a delay lock loop.

14. The network termination device of claim 11, wherein the upstream transmission signal has a Gigabit PON Transmission Convergence upstream burst frame format, and wherein the downstream transmission has a Gigabit PON Transmission Convergence (GTC) downstream frame format.

15. The network termination device of claim 11, wherein the network termination device is an optical network unit (ONU).

16. The network termination device of claim 11, wherein the network termination device is an optical network termination (ONT).

* * * * *